US011567047B2

(12) United States Patent
Ito et al.

(10) Patent No.: US 11,567,047 B2
(45) Date of Patent: Jan. 31, 2023

(54) CHROMATOGRAPHIC DATA SYSTEM PROCESSING APPARATUS

(71) Applicant: Hitachi High-Tech Science Corporation, Tokyo (JP)

(72) Inventors: Masahito Ito, Tokyo (JP); Ikuko Narimatsu, Tokyo (JP); Kazuhiko Okuzawa, Tokyo (JP); Hirofumi Toshima, Tokyo (JP)

(73) Assignee: Hitachi High-Tech Science Corporation, Tokyo (JP)

( * ) Notice: Subject to any disclaimer, the term of this patent is extended or adjusted under 35 U.S.C. 154(b) by 196 days.

(21) Appl. No.: 16/137,627

(22) Filed: Sep. 21, 2018

(65) Prior Publication Data

US 2019/0086374 A1  Mar. 21, 2019

(30) Foreign Application Priority Data

Sep. 21, 2017  (JP) .............................. JP2017-180969

(51) Int. Cl.
*G01N 30/86* (2006.01)
(52) U.S. Cl.
CPC ..... *G01N 30/8637* (2013.01); *G01N 30/8651* (2013.01); *G01N 30/8662* (2013.01)
(58) Field of Classification Search
CPC ........... G01N 30/8637; G01N 30/8651; G01N 30/8662; G01N 2030/027; G01N 30/8631; G01N 30/8634
See application file for complete search history.

(56) References Cited

U.S. PATENT DOCUMENTS

| 5,436,166 A | 7/1995 | Ito et al. |
| 5,670,379 A * | 9/1997 | Ito .......................... G01N 30/82 |
| | | 210/198.2 |
| 5,905,192 A * | 5/1999 | Wikfors ............. G01N 30/8624 |
| | | 210/656 |

(Continued)

FOREIGN PATENT DOCUMENTS

| JP | H02-196959 A | 8/1990 |
| JP | H05-080041 A | 3/1993 |

(Continued)

*Primary Examiner* — Tarun Sinha
*Assistant Examiner* — Yossef Korang-Beheshti
(74) *Attorney, Agent, or Firm* — Banner & Witcoff, Ltd.

(57) ABSTRACT

A chromatographic data system processing apparatus includes a standard sample time table for prestoring a first retention time and a first allowable width of each peak of specific components of a standard sample, a determination unit for determining whether a number of peaks coincides with a specified number when a peak cannot be identified, an alteration unit for altering the standard sample time table by increasing the first allowable width of a specific component to an altered allowable width, an identification unit for identifying the peaks based on the altered standard sample time table when all peaks fall within a range of the altered allowable width, and a setting unit for acquiring an actually-measured retention time of the peaks, and setting a measurement sample time table based on the actually-measured retention time and a second allowable width when the peaks are identified based on the altered standard sample time table.

6 Claims, 16 Drawing Sheets

(56) References Cited

U.S. PATENT DOCUMENTS

| | | | | |
|---|---|---|---|---|
| 6,134,503 | A | * | 10/2000 | Matsumoto ........ G01N 30/8624 702/23 |
| 2002/0062683 | A1 | * | 5/2002 | Ishii .................. G01N 30/8624 73/61.52 |
| 2007/0221836 | A1 | * | 9/2007 | Kobayashi .......... H01J 49/0027 250/282 |
| 2014/0324362 | A1 | * | 10/2014 | Andersson ............. G16C 20/20 702/28 |
| 2016/0224830 | A1 | * | 8/2016 | Noda ................. G01N 30/8634 |

FOREIGN PATENT DOCUMENTS

| | | | |
|---|---|---|---|
| JP | 2602366 | B2 | 4/1997 |
| JP | 2658344 | B2 | 9/1997 |

* cited by examiner

| PEAK No. i | COMPONENT NAME Xi | FIRST RETENTION TIME R1i (min) | FIRST ALLOWABLE WIDTH W1i (min) |
|---|---|---|---|
| 1 | Asp | 4.9 | ±0.2 |
| 2 | Thr | 5.6 | ±0.5 |
| 3 | Ser | 6.2 | ±0.5 |
| 4 | Glu | 7.1 | ±0.5 |
| 5 | Gly | 10.3 | ±1.0 |
| 6 | Ala | 11.2 | ±1.0 |
| : | : | : | : |
| 16 | His | 24.6 | ±2.0 |
| 17 | Arg | 29.1 | ±2.0 |
| : | : | : | : |

(CONT.)

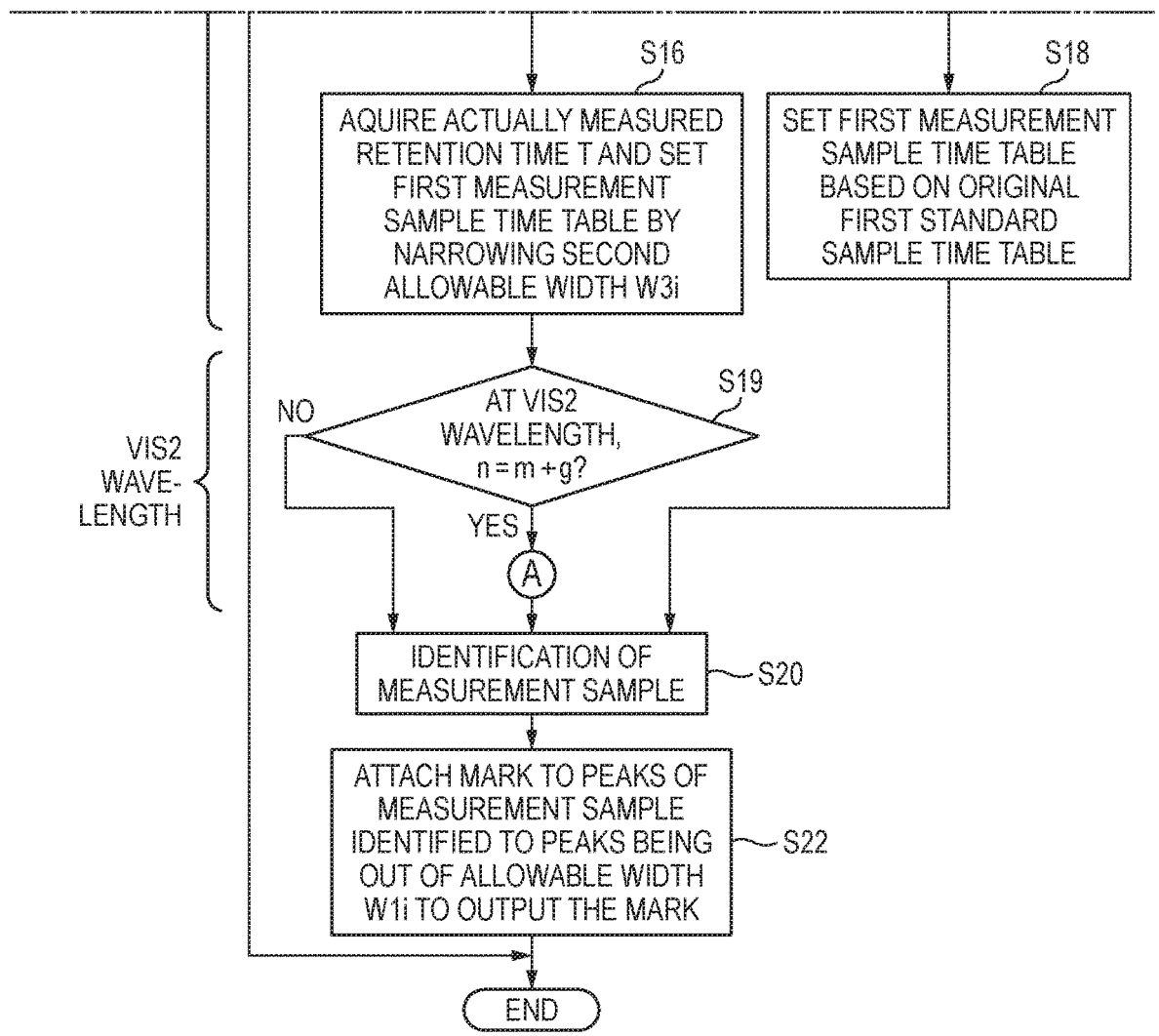

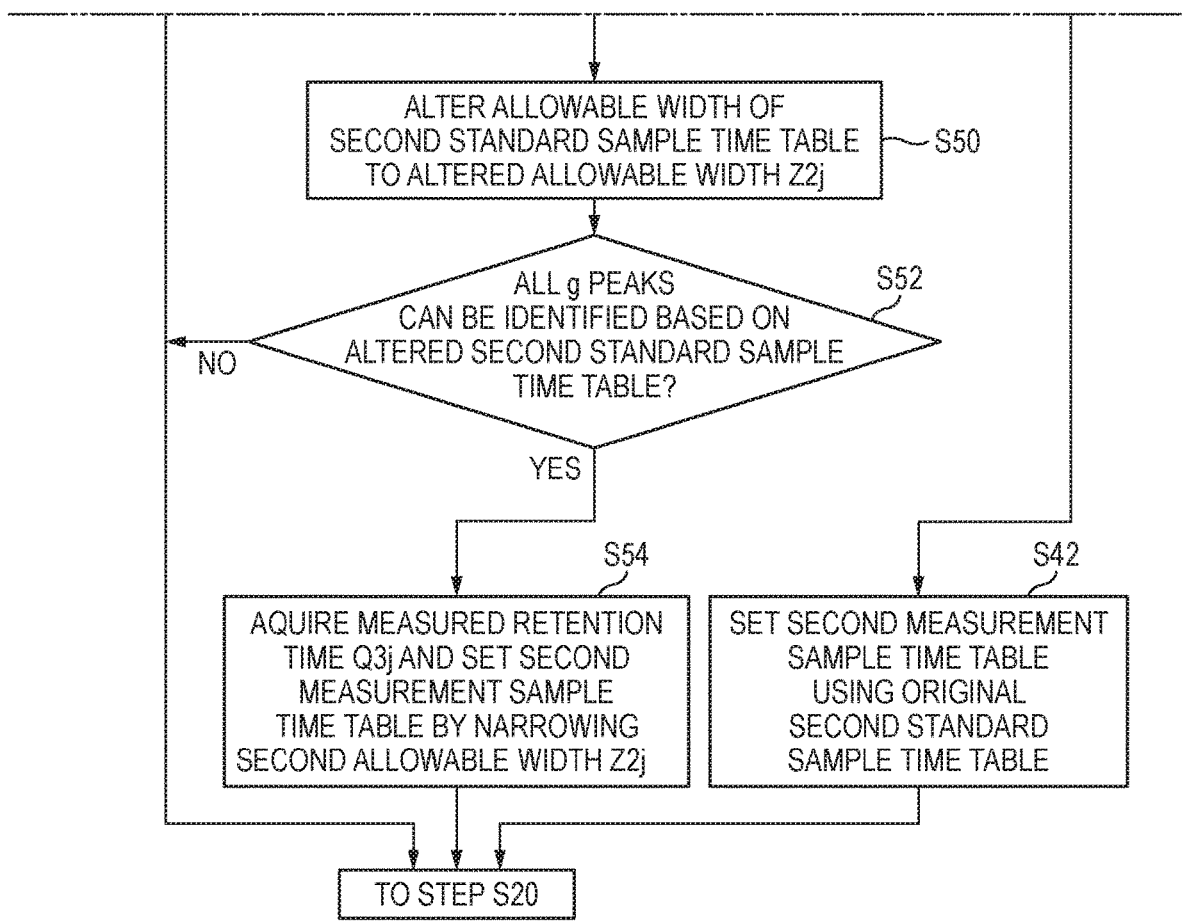

| PEAK No. i | COMPONENT NAME Xi | FIRST RETENTION TIME R1i (min) | ALTERED ALLOWABLE WIDTH W2i (min) |
|---|---|---|---|
| 1 | Asp | 4.9 | ±3.0 |
| 2 | Thr | 5.6 | ±3.0 |
| 3 | Ser | 6.2 | ±3.0 |
| 4 | Glu | 7.1 | ±3.0 |
| 5 | Gly | 10.3 | ±3.0 |
| 6 | Ala | 11.2 | ±3.0 |
| ⋮ | ⋮ | ⋮ | ⋮ |
| 16 | His | 24.6 | ±6.0 |
| 17 | Arg | 29.1 | ±6.0 |
| ⋮ | ⋮ | ⋮ | ⋮ |

FIG. 8

| PEAK No. i | COMPONENT NAME Xi | ACTUALLY MEASURED RETENTION TIME T (min) | SECOND ALLOWABLE WIDTH W3i (min) |
|---|---|---|---|
| 1 | Asp | 4.90 | ±0.2 |
| 2 | Thr | 5.61 | ±0.5 |
| 3 | Ser | 6.22 | ±0.5 |
| 4 | Glu | 7.13 | ±0.5 |
| 5 | Gly | 10.34 | ±1.0 |
| 6 | Ala | 11.17 | ±1.0 |
| : | : | : | : |
| 16 | His | 24.65 | ±2.0 |
| 17 | Arg | 29.16 | ±2.0 |
| : | : | : | : |

FIG. 9

| PEAK No. g | COMPONENT NAME Yj | FIRST RETENTION TIME Q1j (min) | ALLOWABLE WIDTH Z1j (min) |
|---|---|---|---|
| 1 | Pro | 7.6 | ±0.5 |
| 2 | (Hypro) | (13.3) | (±1.0) |

FIG. 10

| PEAK No. g | COMPONENT NAME Yj | ACTUALLY MEASURED RETENTION TIME Q1j (min) | ALTERED ALLOWABLE WIDTH Z2j (min) |
|---|---|---|---|
| 1 | Pro | 7.6 | ±3.0 |
| 2 | (Hypro) | (13.3) | (±3.0) |

| PEAK No. g | COMPONENT NAME Yj | ACTUALLY MEASURED STD RETENTION TIME Q3j (min) | ALLOWABLE WIDTH Z1j (min) |
|---|---|---|---|
| 1 | Pro | 7.69 | ±0.5 |
| 2 | (Hypro) | (13.38) | (±1.0) |

VIS1 RESULT

| No. | RETENTION TIME | COMPONENT NAME | HEIGHT | AREA | TEMPERATURE (nmol) | WEIGHT (ng) | DEGREE OF SEPARATION (JP) | |
|---|---|---|---|---|---|---|---|---|
| 1 | 4.947 | Asp | 228452 | 3285165 | 2.000CAL | 266.200 | 0.000 | |
| 2 | 5.573 | Thr | 241854 | 3623379 | 2.000CAL | 238.200 | 1.700 | M |
| 3 | 6.213 | Ser | 243974 | 3748433 | 2.000CAL | 210.200 | 1.708 | |
| 4 | 7.093 | Glu | 200268 | 3754379 | 2.000CAL | 294.200 | 2.081 | |
| 7 | 10.280 | Gly | 182222 | 3631067 | 2.000CAL | 150.200 | 0.000 | *0.25min |
| 8 | 11.167 | Ala | 135010 | 3426890 | 2.000CAL | 178.200 | 1.505 | *0.25min |
| 9 | 12.220 | Cys | 315449 | 3650134 | 2.000CAL | 480.600 | 2.216 | |
| 10 | 12.753 | Val | 242997 | 3636532 | 2.000CAL | 234.200 | 1.605 | |
| 11 | 14.027 | Met | 183146 | 3611778 | 2.000CAL | 298.400 | 2.869 | |
| 13 | 16.233 | Ile | 125431 | 3483624 | 2.000CAL | 262.400 | 0.000 | |
| 14 | 17.427 | Leu | 108237 | 3582132 | 2.000CAL | 262.400 | 1.489 | |
| 15 | 18.873 | Tyr | 158868 | 3335682 | 2.000CAL | 362.400 | 2.105 | |
| 16 | 19.647 | Phe | 174010 | 3639774 | 2.000CAL | 330.400 | 1.505 | |
| 18 | 22.180 | Lys | 277735 | 3886339 | 2.000CAL | 292.400 | 0.000 | |
| 19 | 23.613 | NH3 | 91246 | 2046739 | 2.000CAL | 34.000 | 3.083 | |
| 20 | 24.620 | His | 199146 | 3591628 | 2.000CAL | 310.400 | 1.933 | |
| 22 | 29.147 | Arg | 120343 | 3286294 | 2.000CAL | 348.400 | 0.000 | |
| TOTAL | | | 3228388 | 59199869 | 34.000CAL | | | |

VIS2 RESULT

| No. | RETENTION TIME | COMPONENT NAME | HEIGHT | AREA | TEMPERATURE (nmol) | WEIGHT (ng) | DEGREE OF SEPARATION (JP) |
|---|---|---|---|---|---|---|---|
| 5 | 7.693 | Pro | 48284 | 965858 | 2.000CAL | 230.200 | 1.196 |
| TOTAL | | | 48284 | 965858 | 2.000CAL | | |

FIG. 14

SETTING WHEN USING WWF FUNCTION

○ WIDE WINDOW AUTOMATIC SETTING

◉ FACTOR MULTIPLIED TO THE ORIGINAL WINDOW
    [ 1.20 ] TIMES

○ INCREMENT ADDED TO ORIGINAL WINDOW
    [ 0.20 ] min

○ CANCEL

FIG. 15

SETTING WHEN USING WWF FUNCTION

○ WIDE WINDOW AUTOMATIC SETTING

◉ FACTOR FOR INCREMENTING IN A SEQUENTIAL METHOD
    [ 0.05 ] STEP    LIMIT TO [ 1.30 ] TIMES

○ INCREMENT FOR IS INCREMENTING IN A
    SEQUENTIAL METHOD
    [ 0.01 ] min    LIMIT TO [ 0.50 ] min

○ CANCEL

ALTERED TIME WINDOW FOR MEASUREMENT SAMPLE

| PEAK No. i | COMPONENT NAME Xi | ACTUALLY MEASURED STD RETENTION TIME Ti (min) | ALLOWABL WIDTH Wi (min) | WWF USE |
|---|---|---|---|---|
| 1 | Asp | 4.90 | ±0.2 | |
| 2 | Thr | 5.61 | ±0.5 | |
| 3 | Ser | 6.22 | ±0.5 | |
| 4 | Glu | 7.13 | ±0.5 | |
| 5 | Gly | 10.34 | ±1.0 | *1.25 TIMES |
| 6 | Ala | 11.17 | ±1.0 | *1.25 TIMES |
| : | : | : | : | : |
| 16 | His | 24.65 | ±2.0 | |
| 17 | Arg | 29.16 | ±2.0 | |

VIS1 RESULT

| No. | RETENTION TIME | COMPONENT NAME | HEIGHT | AREA | TEMPERATURE (nmol) | WEIGHT (ng) | DEGREE OF SEPARATION (JP) | |
|---|---|---|---|---|---|---|---|---|
| 1 | 4.947 | Asp | 228452 | 3285165 | 2.000CAL | 266.200 | 0.000 | |
| 2 | 5.573 | Thr | 241854 | 3623379 | 2.000CAL | 238.200 | 1.700 | |
| 3 | 6.213 | Ser | 243974 | 3748433 | 2.000CAL | 210.200 | 1.708 | |
| 4 | 7.093 | Glu | 200268 | 3754379 | 2.000CAL | 294.200 | 2.081 | |
| 7 | 10.280 | Gly | 182222 | 3631067 | 2.000CAL | 150.200 | 0.000 | *0.25min |
| 8 | 11.167 | Ala | 135010 | 3426890 | 2.000CAL | 178.200 | 1.505 | *0.25min |
| 9 | 12.220 | Cys | 315449 | 3650134 | 2.000CAL | 480.600 | 2.216 | |
| 10 | 12.753 | Val | 242997 | 3636532 | 2.000CAL | 234.200 | 1.605 | |
| 11 | 14.027 | Met | 183146 | 3611778 | 2.000CAL | 298.400 | 2.869 | |
| 13 | 16.233 | Ile | 125431 | 3483624 | 2.000CAL | 262.400 | 0.000 | |
| 14 | 17.427 | Leu | 108237 | 3582132 | 2.000CAL | 262.400 | 1.489 | |
| 15 | 18.873 | Tyr | 158868 | 3335682 | 2.000CAL | 362.400 | 2.105 | |
| 16 | 19.647 | Phe | 174010 | 3639774 | 2.000CAL | 330.400 | 1.505 | |
| 18 | 22.180 | Lys | 277735 | 3886339 | 2.000CAL | 292.400 | 0.000 | |
| 19 | 23.613 | NH3 | 91246 | 2046739 | 2.000CAL | 34.000 | 3.083 | |
| 20 | 24.620 | His | 199146 | 3591628 | 2.000CAL | 310.400 | 1.933 | |
| 22 | 29.147 | Arg | 120343 | 3286294 | 2.000CAL | 348.400 | 0.000 | |
| TOTAL | | | 3228388 | 59199869 | 34.000CAL | | | |

VIS2 RESULT

| No. | RETENTION TIME | COMPONENT NAME | HEIGHT | AREA | TEMPERATURE (nmol) | WEIGHT (ng) | DEGREE OF SEPARATION (JP) |
|---|---|---|---|---|---|---|---|
| 5 | 7.693 | Pro | 48284 | 965858 | 2.000CAL | 230.200 | 1.196 |
| TOTAL | | | 48284 | 965858 | 2.000CAL | | |

| GROUP NAME k | SCOPE OF COMPONENT NUMBER i | CORRELATION COEFFICIENT $r_k$ | DETERMINATION CRITERION |
|---|---|---|---|
| GROUP 1 | 1~6 | $r_1$ | 0.9# OR GREATER |
| GROUP 2 | 7~13 | $r_2$ | 0.9# OR GREATER |
| GROUP 3 | 14~18 | $r_3$ | 0.9# OR GREATER |

CHROMATOGRAPHIC DATA SYSTEM PROCESSING APPARATUS

CROSS-REFERENCE TO RELATED APPLICATION

This application claims priority from Japanese Patent Application No. 2017-180969, filed on Sep. 21, 2017, the entire subject matters of which is incorporated herein by reference.

BACKGROUND

1. Field of the Invention

The present disclosure relates to a chromatographic data system processing apparatus for identifying a peak of chromatograph.

2. Background Art

The chromatographic analysis includes: measuring in advance chromatograph of a known standard sample containing a specific component; recording a retention time and an allowable width of a peak of the specific sample in a table; then measuring chromatograph of an unknown measurement sample (an unknown sample); and identifying the unknown sample to contain the specific component if there is a measurement peak having a same retention time as the retention time within the allowable width of the table (See JP-B-2658344 and JP-B-2602366.).

JP-B-2658344 describes that an appearance order of peaks is recorded in an identification table prepared in advance for the standard sample, so that a so-called identification deviation, that an adjacent peak is identified, is prevented in a case where the retention time is varied due to a change in timing to press a bottom of a measurement apparatus, or the like.

Further, JP-B-2602366 describes that an identification table for the standard sample is prepared in advance, at the time of measurement, the measurement is performed based on the standard sample, and in a case where the standard sample is identified (qualified), the allowable width of the identification table is narrowed and an identification error of the measurement sample is suppressed.

Taking liquid chromatograph as an example, in every measurement, an appearance time (retention time) of a peak of a chromatograph may change due to unexpected factors such as a device idling problem that a pump cycling an eluting solution of the chromatograph apparatus changes, or a change in characteristics of various chemical liquids (for example, the viscosity of a buffer solution or the eluting solution) caused by a change in characteristics of each separation column, a variation in the measurement temperature, or a manufacturing lot difference. This also exist in a case of preparing the identification table by measuring the chromatogram of the standard sample in advance.

However, in the technique of JP-B-2658344, the identification table is fixed as a known item, so that it is not possible to consider the variation in appearance time (retention time) due to a variation in measurement conditions of each day, for example. For this reason, even in a case where the peak of the unknown sample should originally coincide with the peak of the standard sample and be accurately identified, the peak may be mistaken as unidentifiable due to a deviation in peak of the unknown sample caused by the variation in measurement conditions.

Meanwhile, in the technique of JP-B-2602366, there is a problem that a predetermined time window for a known sample must be prepared in advance. Basically, it is intended that one peak is identified in one time window.

SUMMARY

An object of the present disclosure is to provide a chromatographic data system processing apparatus that intends to simultaneously identify multiple input peaks and enables to perform peak identification with identification accuracy equal to that of a method of identifying peaks one by one.

According to an exemplary embodiment of the present disclosure, there is provided a chromatographic data system processing apparatus including:

a standard sample time table configured to prestore a first retention time and a first allowable width of each peak of a plurality of specific components of a standard sample;

a peak number determination unit configured to determine whether or not a number of actually measured peaks having an intensity or a peak area equal to or greater than a predetermined threshold coincides with a specified peak number specified for the standard sample, in a case where one or more actually measured peaks cannot be identified when chromatogram of the standard sample is identified based on the standard sample time table;

a standard sample time table alteration unit configured to alter the standard sample time table by increasing the first allowable width of at least one of the specific components in the standard sample time table to an altered allowable width, in a case where the number of the actually measured peaks is determined to coincide with the specified peak number;

a standard sample identification unit configured to identify the actually measured peaks based on the altered standard sample time table, in a case where all of the actually measured peaks having an intensity or a peak area equal to or greater than the predetermined threshold fall within a range of the altered allowable width taking the first retention time as a center; and a measurement sample time table setting unit configured to acquire an actual retention time of the actually measured peaks as an actually measured retention time, and set a measurement sample time table based on the actually measured retention time and a predetermined second allowable width, in a case where the actually measured peaks are identified based on the altered standard sample time table.

According to the present disclosure, it is possible to provide the chromatographic data system processing apparatus that enables to perform identification of the standard sample in consideration of the change in peak retention time due to the variation in measurement conditions.

BRIEF DESCRIPTION OF THE DRAWINGS

In the accompanying drawings:

FIG. 8 is a diagram showing a data configuration of a measurement sample time table set with an actually measured retention time T;

FIG. 9 is a diagram showing a data configuration of the standard sample time table of the channel 2;

FIG. 10 is a diagram showing a data configuration of the standard sample time table in which the first allowable width W1 is altered to an altered allowable width Z2j of the channel 2;

FIG. 14 is a diagram showing an example of an input screen for setting the altered allowable width W2;

FIG. 15 is a diagram showing another example of the input screen for setting the altered allowable width W2;

DETAILED DESCRIPTION

Hereinafter, embodiments of the present disclosure will be described with reference to the drawings.

Figure 1:
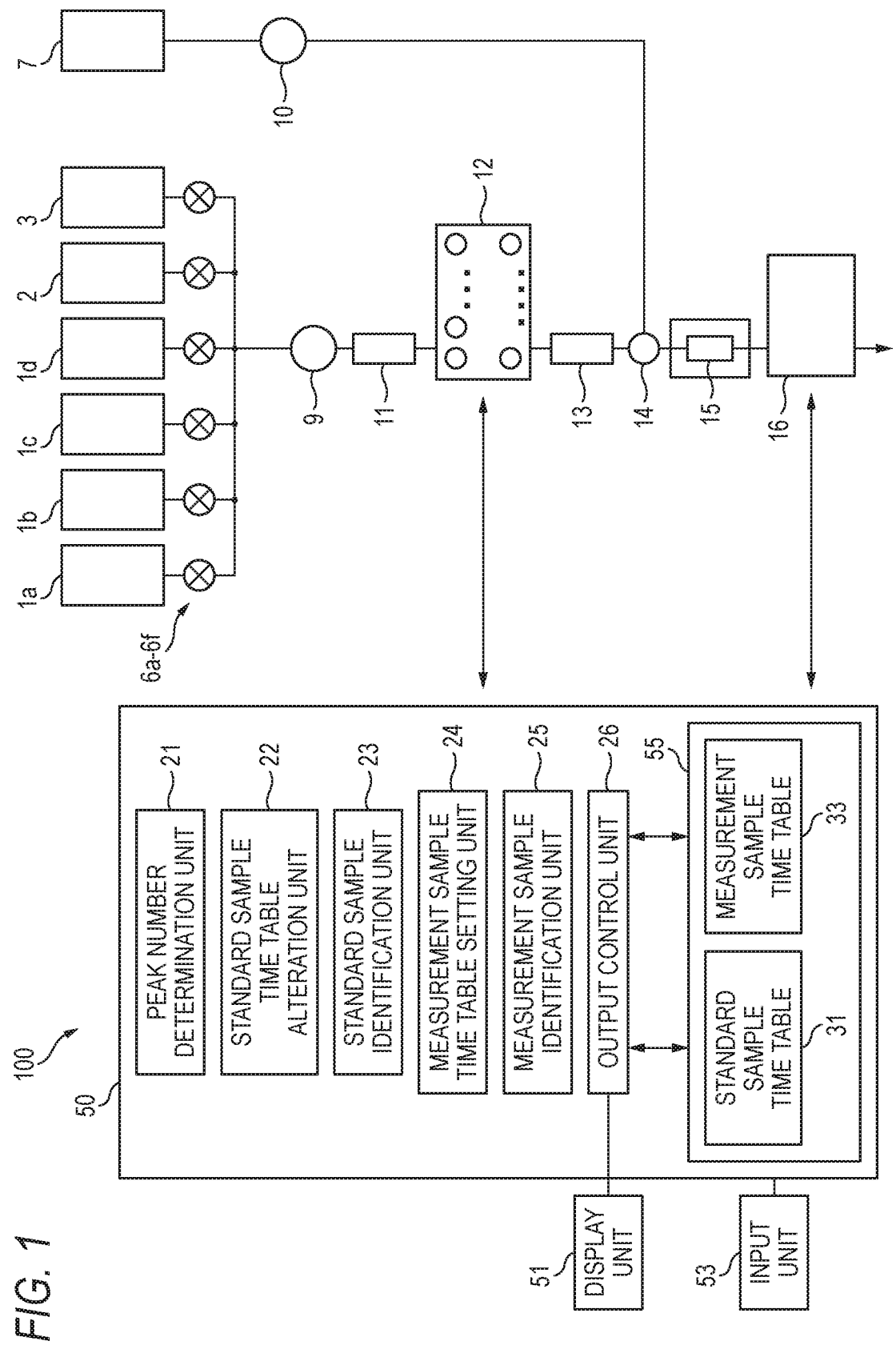
FIG. 1 is a diagram showing a configuration of a chromatograph apparatus which includes a chromatographic data system processing apparatus according to an embodiment of the present disclosure.

FIG. 1 is a diagram showing a configuration of a chromatograph apparatus 100 which includes a chromatographic data system processing apparatus 50 according to an embodiment of the present disclosure, and specifically, the chromatograph apparatus 100 configures a liquid chromatograph analyzing apparatus for amino acid analysis.

The chromatograph apparatus 100 includes first to fourth eluting solution tanks 1a to 1d, a distilled water tank 2 and a column regeneration solution tank 3. The tanks are disposed with corresponding solenoid valves 6a to 6f on downstreams thereof, respectively, and downstreams of the solenoid valves 6a to 6f converge into one flow passage and are connected to an eluting solution pump (plunger pump) 9.

By operating the solenoid valves 6a to 6f corresponding to the tanks, a desired eluting solution passes via an ammonia filter column 11 by means of the eluting solution pump 9, an amino acid sample introduced by an auto sampler 12 is sent, and the amino acid sample in the eluting solution is separated at a separation column 13.

Meanwhile, a ninhydrin pump 10 is disposed downstream of a ninhydrin reagent tank 7, and a ninhydrin reagent sent by the ninhydrin pump 10 converges at a mixer 14 downstream of the separation column 13.

Further, the separated amino acid is mixed with the ninhydrin reagent in the mixer 14, and the mixture is heated to react in a reaction column 15 downstream of the mixer 14. The amino acid developing a color (Roman Purple) by the reaction is detected continuously by a detector 16 downstream of the reaction column 15, and the result is output, recorded and stored as chromatogram and data by the chromatographic data system processing apparatus 50.

The chromatographic data system processing apparatus 50 is, for example, a personal computer, and includes a CPU (Central Processing Unit), a storage unit 55 such as a RAM, a ROM and a hard disk, a display unit 51 such as a monitor, an input unit 53 such as a keyboard which inputs an operator instruction, or the like.

When the operator inputs an instruction of starting a measurement via the input unit 53, the sampler 12 sucks a standard sample under a command from the chromatographic data system processing apparatus 50. All amino acids to be measured are contained in the standard sample in a predetermined amount. In the apparatus as shown in FIG. 1, analysis objects in the standard sample or a measurement sample are separated in advance in the separation column, and thereafter the amino acids in an eluate are selectively modified, derivatized to change into visible or fluorescent substances and detected by the detector 16. Chromatogram as detection data is stored in the storage unit 55 of the chromatographic data system processing apparatus 50.

A standard sample time table 31 stores a first retention time R1 and a first allowable width W1 of each peak of a plurality of specific components of the standard sample, and is stored in the storage unit 55.

A measurement sample time table 33 stores an actually measured retention time T and a second allowable width W3 of each peak of the plurality of specific components, and is stored in the storage unit 55.

A peak number determination unit 21, a standard sample time table alteration unit 22, a standard sample identification unit 23, a measurement sample time table setting unit 24, a measurement sample identification unit 25 and an output control unit 26 are installed as computer programs or the like, and are, for example, read from the ROM to be executed by the CPU.

Figures 2, 3:
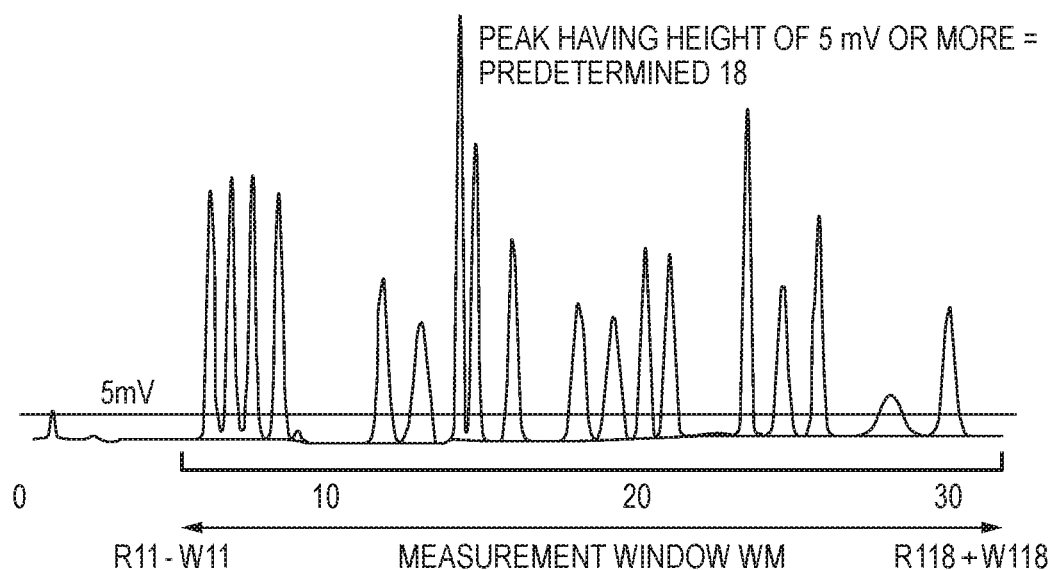
FIG. 2 is a diagram showing a data configuration of a standard sample time table.
FIG. 3 is a diagram showing actually measured chromatogram peaks of a standard sample.

FIG. 2 is a diagram showing a data configuration of the standard sample time table 31, and FIG. 3 is a diagram showing actually measured chromatogram peaks of the standard sample.

As shown in FIG. 2, the standard sample time table 31 stores a first retention time $R1i$ and a first allowable width $W1i$ of each peak of the plurality of specific components (component name $Xi$) of the standard sample. Here, i is a natural number of 1 or greater. Incidentally, i=1 is a peak of a first component with the shortest retention time, corresponding to Asp (aspartic acid). Further, a first retention time of the peak when i=1 is denoted by R11 and a first allowable width of the peak when i=1 is denoted by W11. The same applies to the peak when i=2 or the peaks thereafter. In the present example, i is 1 to 18.

As shown in FIG. 3, there are a plurality of actually measured chromatogram peaks the standard sample (in the present example, the number of original peaks is 18 in a case of accurate measurement), and also shown are actually measured peaks having an intensity equal to or greater than a predetermined threshold (5 mV), among a plurality of actually measured peaks.

Next, a processing flow performed by the chromatographic data system processing apparatus 50 will be described with reference to FIG. 4.

First, the standard sample identification unit 23 extracts (component number n of) measurement components from an original standard sample time table 31 (the first retention time R1 and the first allowable width W1) for VIS1 of FIG. 2, and determines the number of the identified peaks from an identification result for the actually measured peaks of the standard sample (step S2). The identification of the standard sample is performed by determining whether the actually measured peaks of the chromatograph of the measured standard sample coincide with the first retention time R1$i$ of the standard sample time table 31 within an allowable range of the first allowable width W1$i$ (i is a natural number of 1 or greater) respectively, according to a conventional method. The allowable range is the retention time R1$i$±the allowable width W1$i$. Incidentally, in a case where a plurality of actually measured peaks are in one allowable range, one peak (for example, one having a long retention time) is identified according to a predetermined rule. This also applies to the following identification.

Here, VIS1 refers to the measurement at a channel 1 (wavelength 570 nm) of a visible absorptiometer.

Then, the standard sample identification unit 23 determines whether the measured actually measured peaks (are identified) coincide with all first retention times R1$i$ (18 in the present example, i=1 to i=18) which are stored in the standard sample time table 31 (step S4). If the result in step S4 is "Yes", the measurement can be performed without any problem based on the original standard sample time table 31. That is, since there is no need to consider the change in peak retention time due to the variation in the measurement conditions, the measurement sample identification unit 25 sets the original standard sample time table 31 as a measurement sample time table and determines the measurement sample time table 33 (step S18). The measurement sample time table may be set by altering (for example, narrowing) the first allowable width W1$i$ of the original standard sample time table 31.

In contrast, if the result in step S4 is "No", the measurement cannot be performed based on the original standard sample time table 31. That is, since there is a need to consider the change in peak retention time due to the variation in measurement conditions, the following processes are performed.

First, the peak number determination unit 21 extracts first retention times R11, R118 and altered allowable widths W111, W118 of a first component (i=1) to a last component (i=18) from the standard sample time table 31, and determines a measurement window WM (step S6). Specifically, as shown in FIG. 3, a time interval from (the shortest first retention time R11−the altered allowable width W11) to (the longest first retention time R118+the first allowable width W118) is taken as the measurement window WM, and as shown in FIG. 3 the peak number determination unit 21 counts a number m of the actually measured peaks having an intensity equal to or greater than a predetermined threshold (5 mV in the present example) within the measurement window WM (step S8). In step S8, instead of the predetermined threshold or after counting the number of the actually measured peaks having an intensity equal to or greater than the predetermined threshold, the number m of the peaks having a peak area equal to or greater than a predetermined threshold (1,000,000 μV·s in the present example) may be counted. Choosing either the intensity or peak area as the threshold, or choosing both as the threshold, may depend on the standard sample and the measurement sample.

Incidentally, the method for setting the measurement window WM is not particularly limited, and the measurement window WM may be a predetermined range, for example. When the measurement window WM is a time interval from (the first retention time R11−the altered allowable width W111) to (the first retention time R118+the altered allowable width W118), the measurement window WM can be set to exactly cover the range of the measured actually measured peaks, and the counting in step S8 is more accurate.

Subsequently, the peak number determination unit 21 determines whether the number m of the actually measured peak coincides with a specified peak number n (18 in the present example) specified for the standard sample (step S10).

If the result in step S10 is "Yes", the standard sample time table alteration unit 22 alters the first allowable width W1 of the standard sample time table to an increased altered allowable width W2 (step S12).

Figures 6, 7:
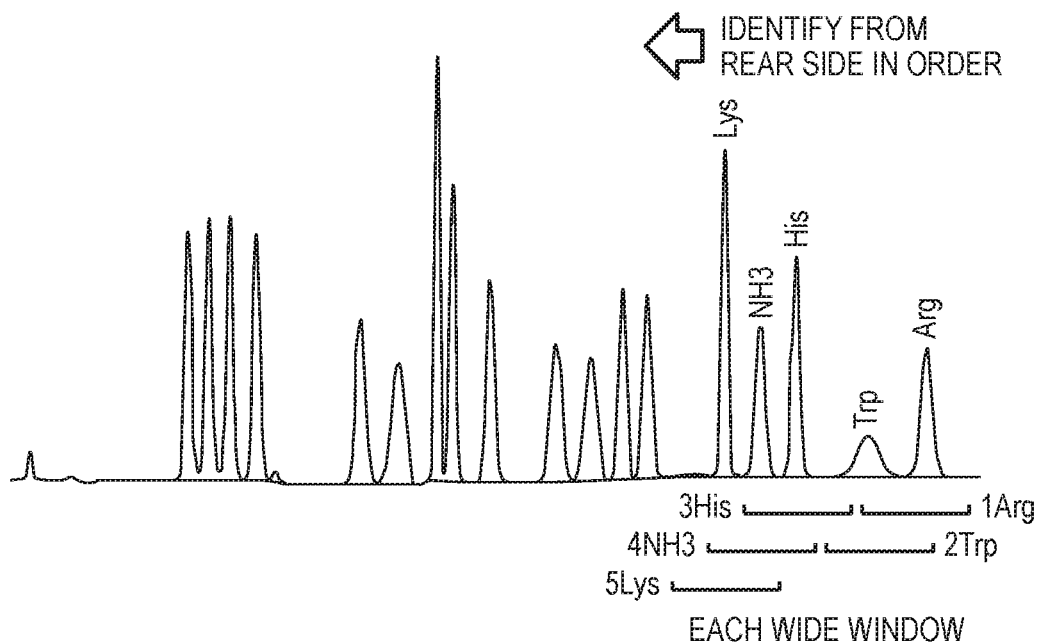
FIG. 6 is a diagram showing a data configuration of the standard sample time table in which a first allowable width W1 is altered to an altered allowable width W2.
FIG. 7 is a diagram showing a mode of identifying actually measured peaks of the standard sample based on the altered standard sample time table.

FIG. 6 is a diagram showing a data configuration of the standard sample time table 31 in which the first allowable width W1 is altered to the altered allowable width W2. As shown in FIG. 6, each altered allowable width W2$i$, in the altered standard sample time table 31, is greater than each first allowable width W1$i$. Although the method for altering the altered allowable width W2$i$ is not limited, in the present example, the altered allowable width W2 is uniformly altered to ±3.0 min when i is 1 to 6, and is uniformly altered to ±6.0 min when i is 7 or greater. Alternatively, as described in FIG. 14, the altered allowable width W2$i$, which is set in the original standard sample time table, may be multiplied or increased by a designated factor.

Incidentally, as a method of altering the standard sample time table 31, since data of the original first allowable width W1$i$ is lost when the table is rewritten, the first allowable width W1$i$ may be separately stored in a region which cannot be rewritten. Further, the original standard sample time table 31 may be left without being rewritten, and the rewritten table may be separately recorded as an altered table.

In contrast, if the result in step S10 is "No", the standard sample time table alteration unit 22 ends the process without performing a series of subsequent processing steps and without performing the alteration of the original time table. This is because if the measurement result in step S10 is "No", a level of relieving the change in peak retention time is exceeded, and the measurement is inaccurate.

Following the step S12, the standard sample identification unit 23 determines whether all m actually measured peaks (18 in the present example) counted in step S8 can be identified based on the altered standard sample time table 31 (step S14). The identification is performed by determining whether each of the m actually measured peaks coincides with each first retention time R1$i$ of the altered standard sample time table 31 within the allowable range of each altered allowable width W2$i$. Incidentally, the allowable range is the retention time R1$i$±the altered allowable width W2$i$.

FIG. 7 shows a mode of identifying the actually measured peaks of the standard sample based on the altered standard sample time table 31. In the present example, identification is performed in an order from a peak having a longer retention time to a peak having a shorter retention time within the altered allowable width W2i.

If the result in step 14 is "Yes", the measurement sample time table setting unit 24 obtains the actual retention time of the actually measured peak as the actually measured retention time T, and sets the measurement sample time table 33 based on the actually measured retention time T and a predetermined second allowable width W3 (step S16).

FIG. 8 is a diagram showing a data configuration of the measurement sample time table 33 set with the actually measured retention time T. For example, with respect to a first retention time R12=5.6 (min) of a peak of a second component (Thr: Threonine) when i=2, an actually measured retention time T2 of the actually measured peak is 5.61 (min) when the actually measured peaks of the standard sample are identified. Accordingly, the actually measured retention time T2 in the measurement sample time table 33 is set to be 5.61 (min).

In the present example, the second allowable width W3 is set to be the original first allowable width W1, that is, the second allowable width W3 is made narrower than the altered allowable width W2. When making the second allowable width W3 narrower than the altered allowable width W2, the identification error for the measurement sample is suppressed, and the measurement accuracy is increased. However, the second allowable width W3 is not limited thereto.

In contrast, if the result in step S14 is "No", the measurement sample time table setting unit 24 ends the process without performing a series of subsequent processing steps and without performing the alteration of the original time table. Similar to the case of step S10, this is because if the measurement result in step S14 is "No", the level of reliving the change in peak retention time is exceeded, and the measurement is inaccurate.

Following the step S16, a measurement for continuously creating a measurement sample time table is performed at a wavelength VIS2 (a channel 2 of the visible absorptiometer (wavelength 440 nm)) different from VIS1.

Figure 4:
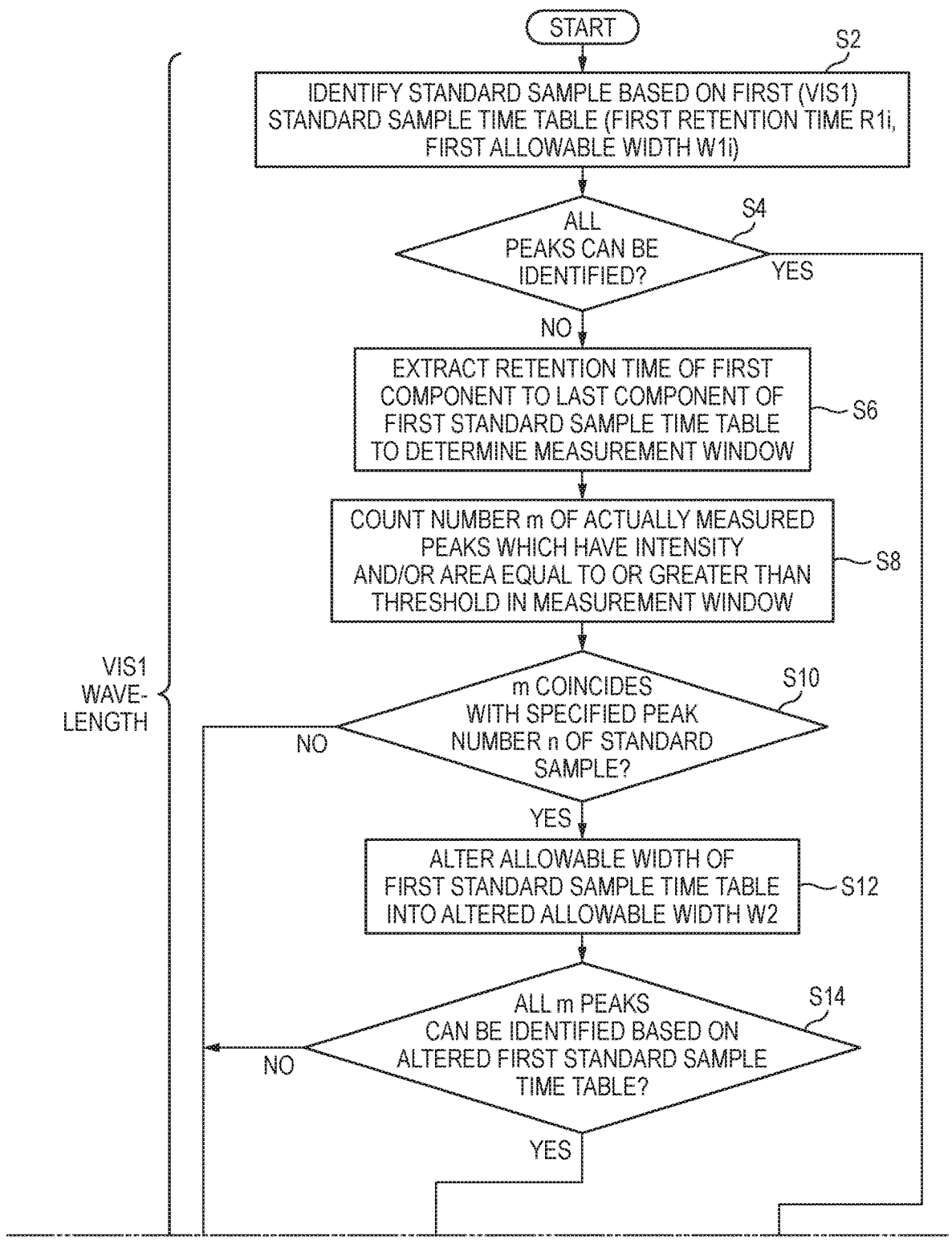
FIG. 4 is a diagram showing a processing flow performed by the chromatographic data system processing apparatus.

Although the above-described FIG. 4 shows an example in which amino acids are analyzed at VIS1 (the channel 1 of the visible absorptiometer: 570 nm), the amino acids also include a compound like proline (Pro), whose peak at VIS1 is relatively small and which is difficult to quantify.

Accordingly, other amino acids are identified at one wavelength (VIS1), whereas the peak of the proline is identified and quantified at a different wavelength (VIS2: 440 nm), so that the proline is not desired to be identified (detected) at VIS1. Therefore, the threshold of step S8 in FIG. 4 is set to be a value at which the proline will not be detected, so that the result in step S10 is usually set to "Yes", that is, the proline is not detected.

However, there is also a case where the proline is detected, and in such a case, the process shown in FIG. 3 is performed in order to increase the threshold for detecting a peak at VIS1 and not to detect the proline.

In FIG. 3, a threshold of an intensity regarded as a peak in a whole region of the measurement wavelength of VIS1 is set first. In FIG. 3, an intensity of 5 mV is set as the threshold. In a case where the peak number detected here is equal to or greater than n, a threshold is sequentially increased until the detected peak number coincides with n, and the identification is performed in a state where the proline is not detected at the wavelength region of VIS1.

Specifically, for example, the intensity in step S8 is 2 times (10 mV in the present example) as high as the intensity in FIG. 3.

With respect to the wavelength range of VIS2, in FIG. 4, following the step S16, it is determined whether a value, which is obtained by adding g to the peak number m identified in the step S10, coincides with the component number n of the measurement object (step S19). g is the peak number which should be detected at the wavelength VIS2 without being detected at the wavelength VIS1 Since there is only the peak of Pro in the present example, g is 1.

Figure 5:
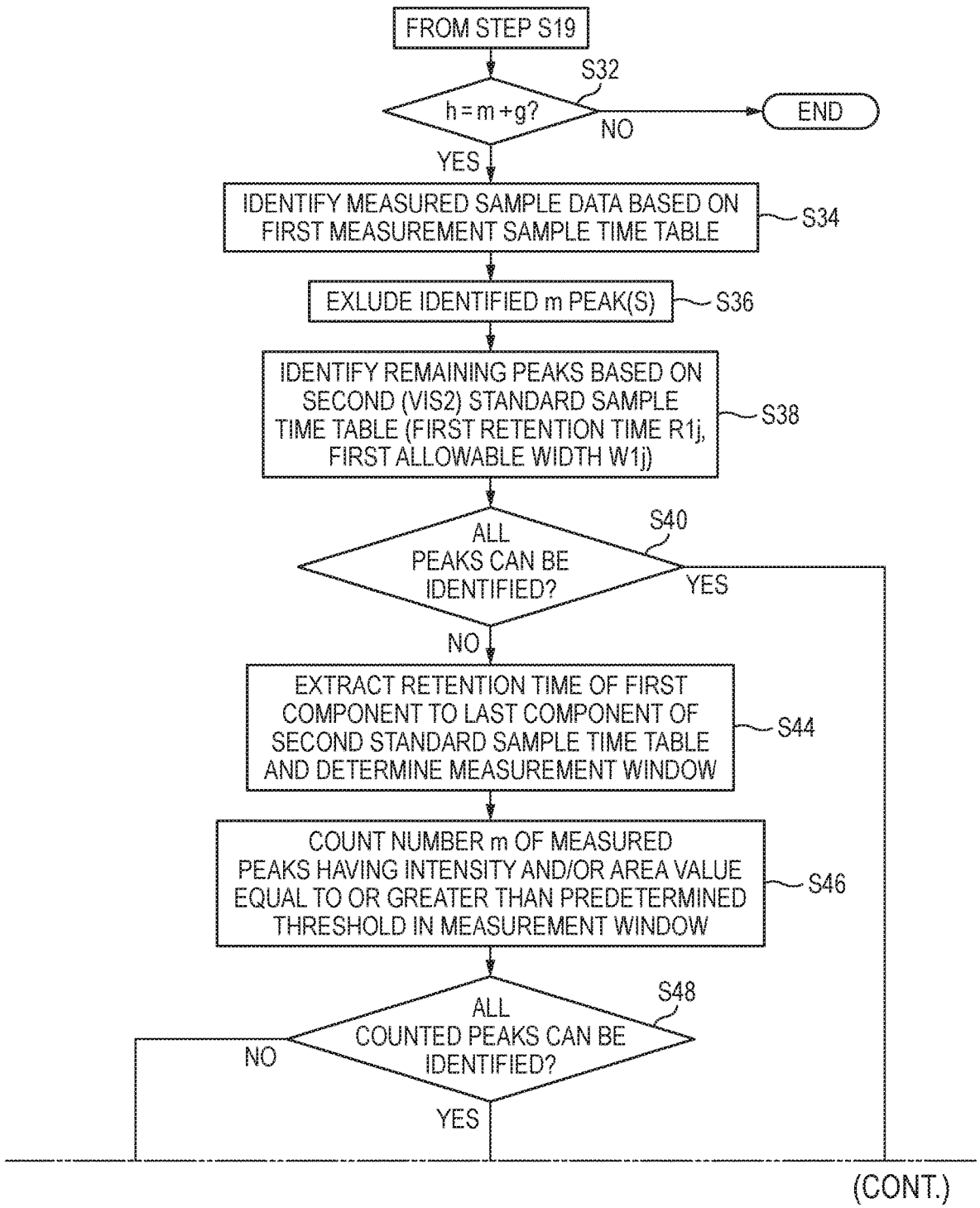
FIG. 5 is a diagram showing a processing flow performed by the chromatographic data system processing apparatus at a channel 2 (portion A in FIG. 4)

If the result in step S19 is "Yes", the peak number is 1 more than the peak number m when the proline is not detected originally, so that it is assumed that proline is detected, and the process proceeds to step S32 in FIG. 5.

In step S32, it is determined whether a peak number, i.e., a total number (h=m+g) of the number m of the actually measured peaks which is identified in step S16 or S18, and the peak number g which should be identified at VIS2, can be detected. If the result in step S32 is "No", the process is also ended without performing the alteration of the time table according to VIS2, because the level of reliving the change in peak retention time is exceeded, and the measurement is inaccurate. This is because if the measurement result in step S32 is "No", the level of reliving the change in peak retention time is exceeded, and the measurement is inaccurate.

First, if the result in step S32 is "Yes", the peaks identified at VIS1 are extracted using the measurement sample time table 33 for VIS1, which is determined in step S18, and are excluded from identification objects after the next step (steps S34 and S36).

Regarding the actually measured peak remaining after the exclusion, the standard sample identification unit 23 identifies a standard sample thereof based on the original standard sample time table 31 (a first retention time Q1j and a first allowable width Z1j) for VIS2 in FIG. 9 (step S38). The identification of the standard sample is performed by determining whether a peak equal to or greater than the threshold, in the actually measured peaks of the chromatograph of the measured standard sample, coincides with the first retention time Q1j of the standard sample time table 31 within an allowable range of the first allowable width Z1j (j is a natural number of 1 or greater) respectively, according to the conventional method. Incidentally, the allowable range is the retention time Q1j±the altered allowable width Z1j.

Next, it is determined whether all of the remaining peaks can be identified (step S40). If the result in step S40 is "Yes", the measurement sample time table setting unit 24 does not alter the original standard sample time table 31 for VIS2, and sets the original standard sample time table 31 as the measurement sample time table 33 for VIS2 (step S42).

If the result in step S40 is "No", the measurement sample time table setting unit 24 alters the allowable width, as in the step S12 of VIS1, to a wide allowable width Z2j so as to create a measurement sample time table (FIG. 10) (steps S44 and S46). Next, it is determined whether all of the actually measured peaks can be identified (step S48). In a case where not all of the actually measured peaks can be identified, the measurement sample time table setting unit 24 ends the process without altering the original standard sample time table 31 for VIS2.

In a case where all of the actually measured peaks can be identified, the measurement sample time table setting unit 24 creates a measurement sample time table for VIS2 using an actually measured retention time Q3j and the original allowable width Z1j (step S50).

Following the step S50, the standard sample identification unit 23 determines whether all the g actually measured peaks can be identified based on the altered standard sample time table 31 (step S52). The identification is performed by determining whether the actually measured peaks coincide with the first retention time $Q3j$ of the altered standard sample time table 31 within the allowable range of the altered allowable width $Z1j$, respectively. Incidentally, the allowable range is the retention time $Q3j\pm$the altered allowable width $Z1j$.

Following the step S50, the measurement sample identification unit 25 determines the measurement sample time table set in step S50 as a measurement sample time table (step S54).

Next, the output control unit 26 attaches mark information (mark) to the actually measured peaks which are identified in correspondence with the peaks being out of the first allowable width W1 to output the mark information with the actually measured peaks (step S22 in FIG. 4).

Figures 11, 12:
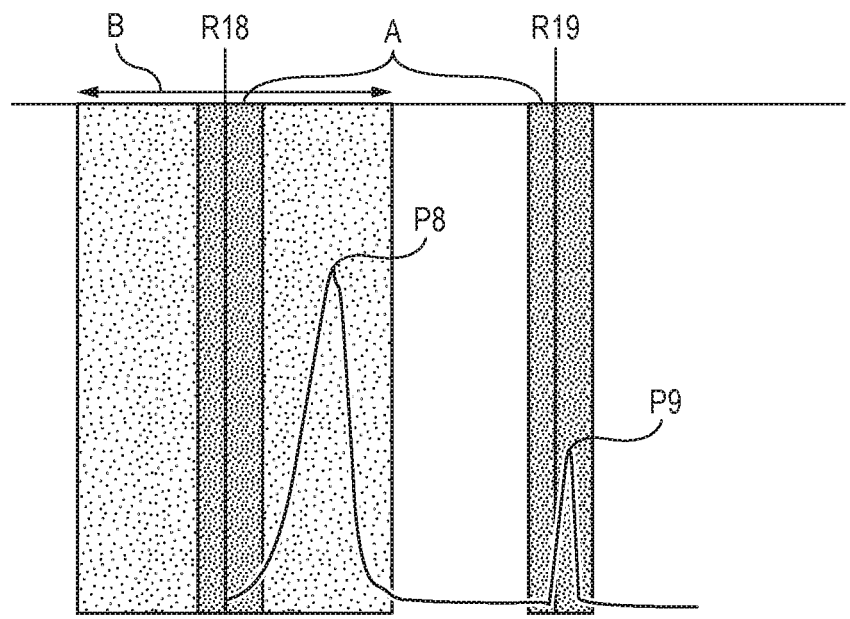
FIG. 11 is a diagram showing a data configuration of the measurement sample time table of the channel 2 set with an actually measured retention time Q3.
FIG. 12 is a diagram showing a processing method of attaching a mark to an identified standard sample peak among peaks out of the first allowable width W1.

Specifically, the process of step S22 in FIG. 4 can be performed as shown in FIG. 12, for example. First, the standard sample identification unit 23 identifies all the m actually measured peaks based on the altered standard sample time table 31 in step S14, and also identifies all the m actually measured peaks based on the standard sample time table 31 before alteration. For example, it can be seen that a peak P8 of an eighth component is out of an allowable range (window) A of the original standard sample time table 31, and a peak P9 of a ninth component is in a range of the allowable range A.

Accordingly, the output control unit 26 attaches identification information (for example, a flag) to data of the peak P8 out of the range of allowable range A, and outputs the identification result for the actually measured peaks by causing the display unit 51 to display the mark as appropriate. Of course, the peak P8 is in a range of an allowable range (window) B of the altered standard sample time table 31 in FIG. 12.

Figure 13:
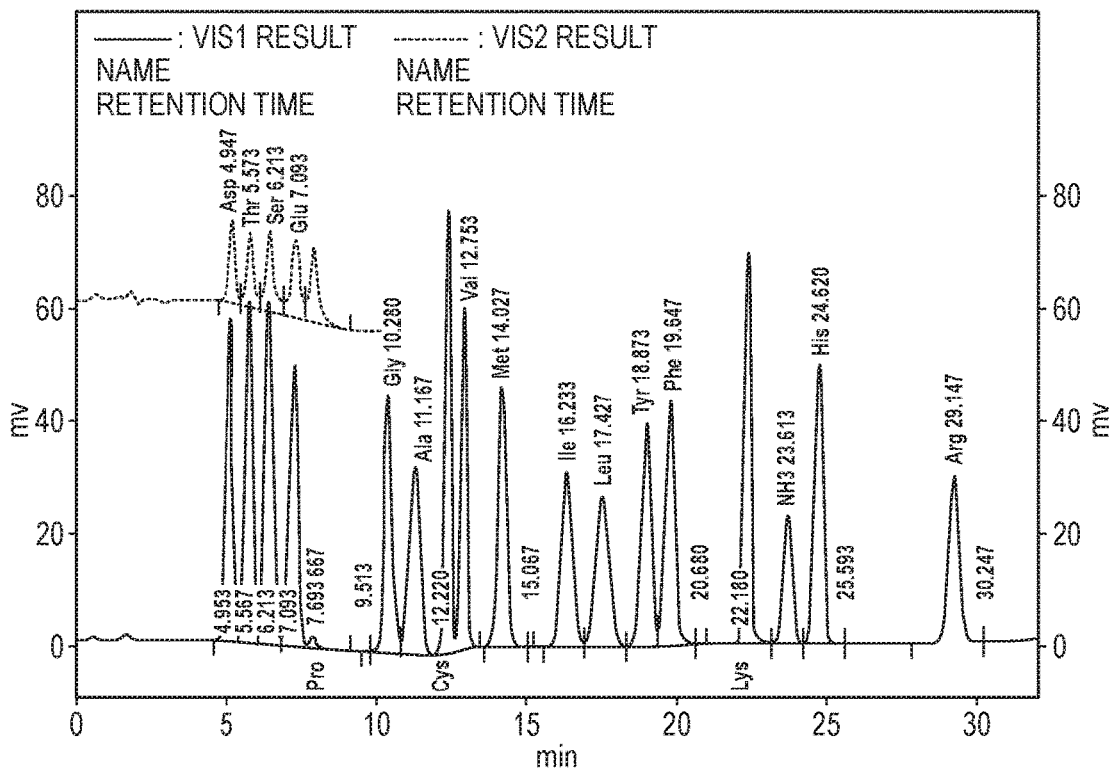
FIG. 13 is a diagram showing a mode of displaying the mark which is attached to the identified standard sample peak among the peaks out of the first allowable width W1.

FIG. 13 shows a mode of displaying the mark which is attached to the actually measured peak of the identified standard sample among the peaks out of the first allowable width W1.

In FIG. 13, other than a chart of the actually measured peaks (upper row), identification results (peak No., retention time, component name, etc.,) for the actually measured peak of each measurement sample are displayed in a form of a table (lower row), in which at the right side of columns of the seventh and eighth components (peak Nos. 7 and 8), each mark M is displayed. The mark M indicates how much each actually measured retention time of the seventh and eighth components is out of the allowable range A, and each actually measured retention time thereof is out of the allowable range A by 0.25 min in the present example.

Incidentally, the display form of the mark M is not limited to the above description, and for example, the mark M may be written on the chart of the actually measured peak.

As described above, the mark information (mark) is attached to the actually measured peaks which are identified in correspondence with the peaks being out of the first allowable width W1 to be output with the actually measured peaks, so that operators can recognize that the peaks of the standard sample are measured based on the peaks of the standard sample measured in step S14 by using the altered standard sample time table 31. Accordingly, for example, it is possible to give information for the operators to presume the reason of generating the change in peak retention time, and it can be helpful for cause analysis or improvement of the change in peak retention time.

According to the chromatographic data system processing apparatus, in a case where the peak retention time changes due to the variation in measurement conditions, since the first allowable width W1 is widened so as to alleviate the identification condition for the standard sample, the identification of the standard sample can be performed. Further, since the first allowable width W1 is widened only when the number of the actually measured peaks coincides with the specified peak number, the standard sample is not identified in a case where the two numbers do not coincide with each other, the level of reliving the change in peak retention time is exceeded, and the measurement is inaccurate.

In addition, since the actual retention time of the actually measured peaks is used for the measurement sample time table when performing the identification of the standard sample, the identification of an unknown sample can also be performed in a case where the peak retention time changes due to the variation in measurement conditions.

The method for setting the altered allowable width W2 is not limited. For example, as shown in FIG. 14, an input box may be provided on an input screen of the display unit 51, which is used for setting the altered allowable width W2 several times of the first allowable width W1, and to which the operators may input the numerical value. Further, as shown in FIG. 15, an input box may be provided on the input screen of the display unit 51, which is used for setting the altered allowable width W2 such that it increases from the first allowable width W1 by a certain number for one time (in FIG. 15, 0.05 a step, that is, 0.05 min at one time), and to which the operators may input the numerical value. In this case, the altered allowable width W2 is widened gradually by 0.01 min a step in the input box by a successive method, the successive increase is stopped when the peaks of the standard sample are completely identified, and the value may be determined as the altered allowable width W2. Incidentally, in the case of FIG. 15, an upper limit can be set for stopping the altered allowable width W2 at a value 1.3 times of the first allowable width W1.

Among the chromatograms of FIG. 13, the chromatogram displayed on the entire screen is generated for VIS1, and the chromatogram displayed at the top left is generated for VIS2.

The present disclosure is not limited to the above-described embodiment, but it goes without saying that it extends to various modifications and equivalents included in the spirit and scope of the present invention.

Figures 16, 17:
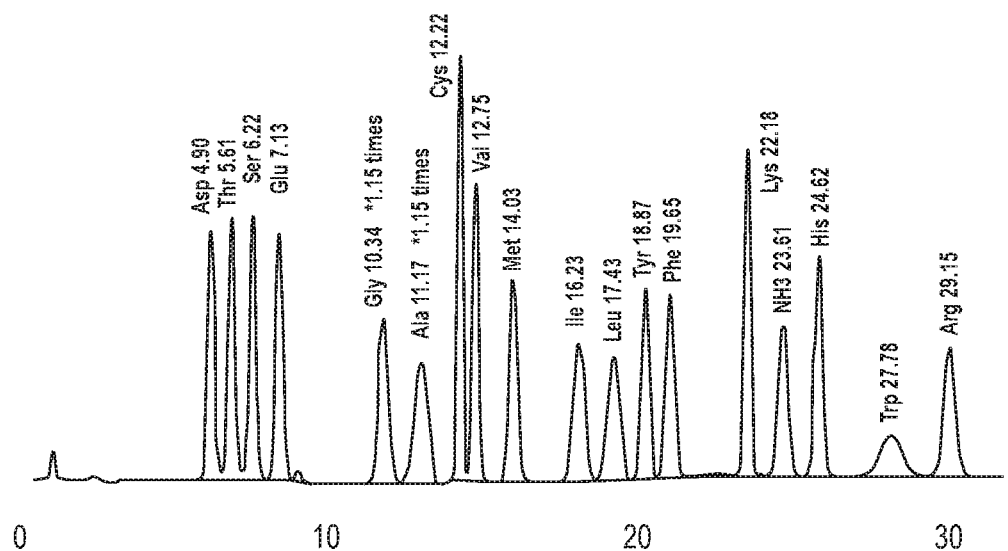
FIG. 16 is a diagram showing an example of a mode of displaying the mark which is attached to the identified standard sample peak among the peaks out of the first allowable width W1.
FIG. 17 is a diagram showing another example of the mode of displaying the mark which is attached to the identified standard sample results among the peaks out of the first allowable width W1.
Figure 18:
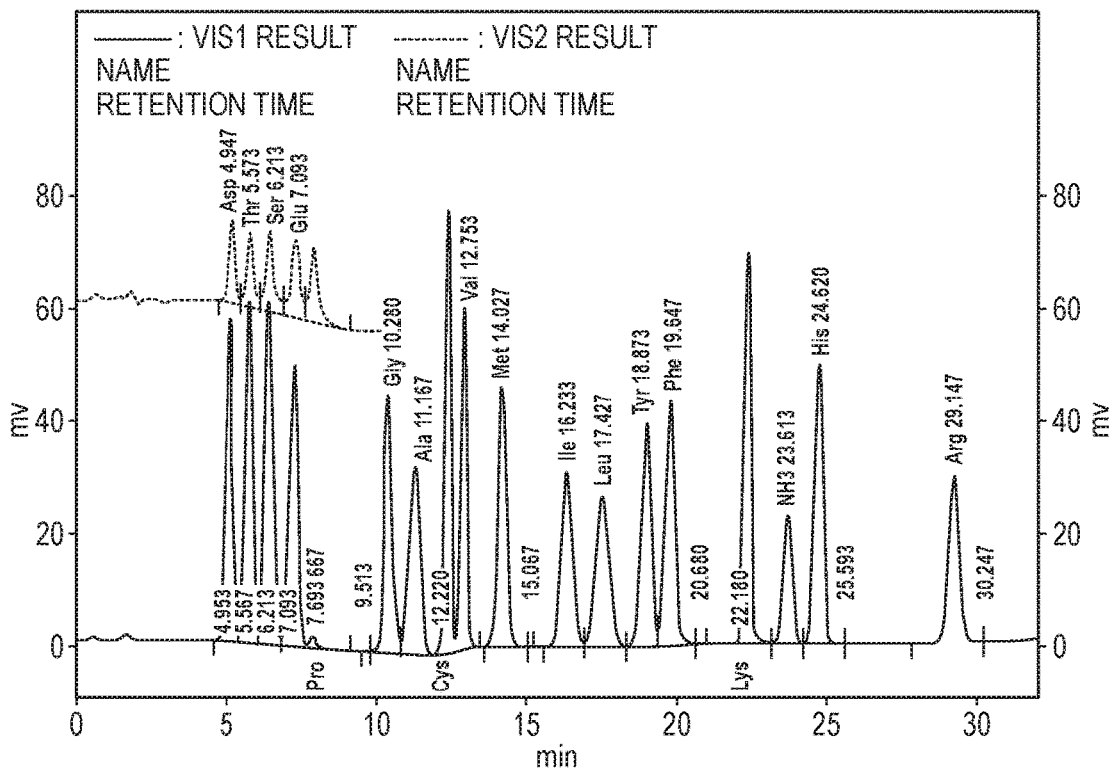
FIG. 18 is a diagram showing yet another example of the mode of displaying the mark which is attached to the identified standard sample results among the peaks out of the first allowable width W1.

As shown in FIGS. 16 to 18, the altered allowable width W3 determined in FIG. 8 or the like may be displayed on a result report and/or chromatogram displayed by the display unit 51. In FIGS. 16 to 18, the mark M is added to display an increment (*1.15 min or the like) or a magnification (*1.25 times or the like) at the time of changing from the allowable width W1 to the altered allowable width W3.

Incidentally, for example, a magnification of *1.15 times means that in a case where the first allowable width W1 is ±0.20 min, the time window is gradually widened, and a certain peak is captured for the first time when the altered allowable width W2 is ±0.23 min. It means that in a case where the first allowable width W1 is ±0.30 min, the time window is gradually widened, and a peak certain is captured for the first time when the altered allowable width W2 is ±0.345 min.

The mark information is also not limited to the mark M, as long as it can be recognized by the operators.

Figures 19, 20:
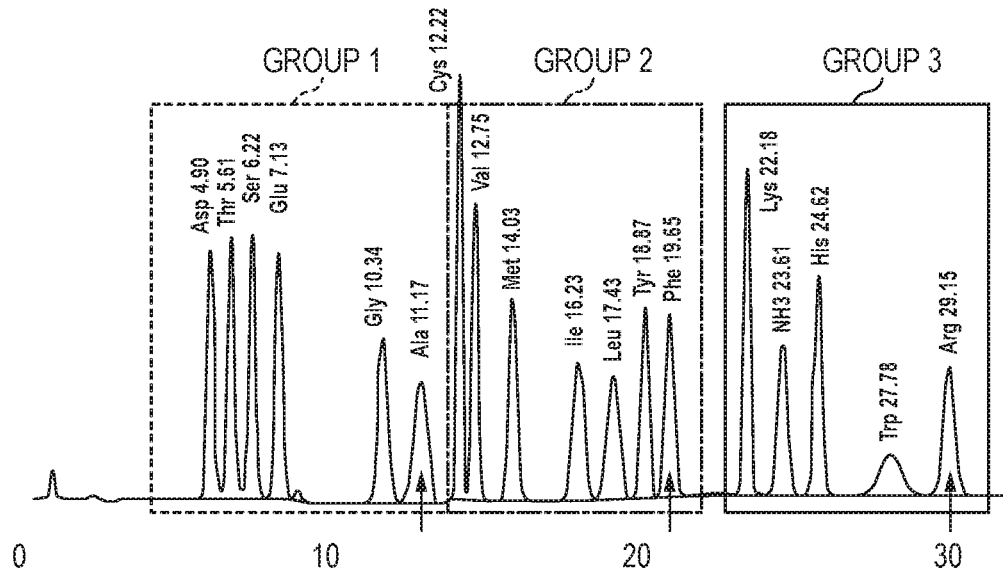
FIG. 19 is a diagram showing three groups of amino acids.
FIG. 20 is a diagram showing determination of a correlation coefficient.

Further, as shown in FIGS. 19 and 20, it may be verified that the peaks of the measurement sample identified in steps S2 to S16 are correct.

For example, as shown in FIG. 19, the amino acids identified at VIS1 are divided into three groups according to the compound property thereof.

In this case, it is determined whether a peak of a last elution component (the component of which the retention time is the longest) of each group is within the second allowable width W3.

For example, in FIG. 9, it is determined whether the peak of the sixth peak (Ala: alanine) which is the last elution component of group 1 is within a range of the actually measured retention time T6±the second allowable width W36, whether the peak of the thirteenth peak (Phe: phenylalanine) which is the last elution component of group 2 is within a range of the actually measured retention time T13±the second allowable width W313, and whether the peak of the eighteenth peak (Arg: arginine) which is the last elution component of the last group 3 is within a range of the actually measured retention time T18±the second allowable width W318. The three groups of amino acids refer to groups of amino acids to be eluted according to switching of a plurality of eluting solutions (a buffer solution having a mobile phase).

Incidentally, the reason for determining the peak of the last elution component is that the later elution component has a greater retention time change due to the variation in measurement conditions.

In FIG. 19, if the peak of the last elution component in each group is within the second allowable width W3, the determination in FIG. 20 is further performed, and if the second allowable width W3 is exceeded, it is determined that the identification cannot be performed accurately.

Next, as shown in FIG. 19, a correlation coefficient $r_k$ of the first retention time Ri and the actually measured retention time Ti of the elution component i which belongs to each group k, is calculated from the following equation.

Further, in a case where all the correlation coefficients $r_1$ to $r_3$ of the groups are equal to or greater than a reference value (for example, 0.9 or greater), it is determined that that the identified peaks are accurate, and in a case where one of the three groups is out of the reference value, it is determined that the identification cannot be performed accurately.

$$r_k = \frac{\Sigma_i(t_i - \bar{t})(R_i - \bar{R})}{\sqrt{\Sigma_i(t_i - \bar{t})^2 \Sigma_i(R_i - \bar{R})^2}}$$

Incidentally, when there is one group, the determination in FIG. 19 is performed for the peak of the last elution component of the group, and the determination in FIG. 20 is further performed for all the measured components of the group.

As a method for determining a probability of the peaks of the measurement sample identified in step S2 to S16, for example, a peak width may be determined.

The peak width (s) in the chromatogram is only a unit of time, and is substantially an inherent value for measurement components, and does not change in proportion to the concentration of the measurement component or the injection amount as the peak area or the peak height (signal intensity). For example, the peak width (s) can be a value obtained by dividing the peak area (μV·s) by the peak height (μV), or a full width at half maximum (s) can be used as the peak width.

Accordingly, upper and lower limit values of the peak width are set as thresholds for each component in advance. If the peak width of each identified component is within a range defined with the thresholds, it can be decided that the peak of the component is accurately identified.

What is claimed is:

1. A chromatographic data system processing apparatus comprising:
    memory storing a standard sample time table, the standard sample time table configured to pre-store a first retention time and a first width of each peak of a plurality of specific components of a standard sample; and
    a controller configured to execute processing of:
        determining whether or not a total number of actually measured peaks having an intensity or a peak area equal to or greater than a predetermined threshold coincides with a specified peak number specified for the standard sample, in a case where one or more actually measured peaks cannot be identified when a chromatogram of the standard sample is identified based on the standard sample time table, wherein the determining whether or not the total number of actually measured peaks having an intensity or a peak area equal to or greater than a predetermined threshold coincides with a specific peak number specified for the standard sample includes:
        determining the total number of the actually measured peaks within a range of a measurement window that is represented by a time interval between a minimum time obtained by subtracting a first altered width from a shortest first retention time in the standard sample time table and a maximum time obtained by adding the first altered width to a longest first retention time in the standard sample time table;
        altering the standard sample time table by increasing the first width of at least one of the specific components in the standard sample time table to a second altered width, in a case where the total number of the actually measured peaks is determined to coincide with the specified peak number;
        identifying the actually measured peaks based on the altered standard sample time table, in a case where all of the actually measured peaks having an intensity or a peak area equal to or greater than the predetermined threshold fall within a range of the altered width taking the first retention time as a center; and
        acquiring an actual retention time of the actually measured peaks as an actually measured retention time, and set a measurement sample time table based on the actually measured retention time and a predetermined second width, in a case where the actually measured peaks are identified based on the altered standard sample time table.

2. The chromatographic data system processing apparatus according to claim 1,
    wherein the standard sample time table is altered such that the second width is narrower than the second altered width.

3. The chromatographic data system processing apparatus according to claim 1, wherein the controller is configured to execute processing of:
    outputting an identification result for the actually measured peaks, and wherein the controller attaches mark information to the actually measured peaks that are identified in correspondence with peaks being out of the first width to output the mark information with the actually measured peaks.

4. The chromatographic data system processing apparatus according to claim 1,
wherein in a case where a specific component that should not be identified at a predetermined measurement wavelength is identified, the controller increases the threshold in order not to measure the specific component that should not be identified at the predetermined measurement wavelength.

5. The chromatographic data system processing apparatus according to claim 1:
wherein the controller is configured to execute processing of:
identifying actually measured peaks of a measurement sample based on the measurement sample time table, and
wherein after the controller identifies the actually measured peaks of the measurement sample, the controller determines whether or not a peak of at least a last eluted component among the actually measured peaks of the measurement sample falls within a range of the second width or falls within a range defined with thresholds of a predetermined peak width, and decides that it is accurately identified in a case of positive determination.

6. The chromatographic data system processing apparatus according to claim 1:
wherein the controller is configured to execute processing of:
identifying actually measured peaks of a measurement sample based on the measurement sample time table, and
wherein after the controller identifies the actually measured peaks of the measurement sample, the controller calculates a correlation coefficient of the actually measured retention time and the first retention time, which correspond to each of all the actually measured peaks, and determines whether or not the correlation coefficient is equal to or greater than a reference value, and decides that it is accurately identified in a case of positive determination.

\* \* \* \* \*